United States Patent
Smith (10) Patent No.: US 9,246,672 B2
(45) Date of Patent: Jan. 26, 2016

(54) TWO INDICES MOVING IN OPPOSITE DIRECTIONS FOR CRYPTOGRAPHIC BIDIRECTIONAL COMMUNICATIONS USING A SHARED MASTER KEY

(75) Inventor: Ryan Tracy Smith, Guelph (CA)

(73) Assignee: BlackBerry Limited, Waterloo (CA)

( * ) Notice: Subject to any disclaimer, the term of this patent is extended or adjusted under 35 U.S.C. 154(b) by 692 days.

(21) Appl. No.: 12/822,380

(22) Filed: Jun. 24, 2010

(65) Prior Publication Data
US 2011/0317837 A1    Dec. 29, 2011

(51) Int. Cl.
*H04L 9/00* (2006.01)
*H04L 9/06* (2006.01)
*H04L 9/08* (2006.01)

(52) U.S. Cl.
CPC ............ *H04L 9/0656* (2013.01); *H04L 9/0891* (2013.01); *H04L 2209/76* (2013.01)

(58) Field of Classification Search
CPC .. H04L 9/0656; H04L 9/0891; H04L 2209/76
USPC ......................................... 380/259, 260, 277
See application file for complete search history.

(56) References Cited

U.S. PATENT DOCUMENTS

| | | | |
|---|---|---|---|
| 6,337,910 B1 | 1/2002 | Goff et al. | |
| 6,445,794 B1 | 9/2002 | Shefi | |
| 6,490,353 B1 | 12/2002 | Tan | |
| 7,133,525 B1 | 11/2006 | DeGregorio et al. | |
| 2005/0083846 A1* | 4/2005 | Bahl | 370/236 |
| 2006/0010324 A1* | 1/2006 | Appenzeller et al. | 713/171 |
| 2006/0177065 A1 | 8/2006 | Halbert | |
| 2007/0074277 A1 | 3/2007 | Tofts et al. | |
| 2007/0076877 A1* | 4/2007 | Camp et al. | 380/255 |
| 2007/0172054 A1 | 7/2007 | Munro et al. | |
| 2007/0234051 A1 | 10/2007 | Akutsu et al. | |
| 2007/0297612 A1 | 12/2007 | Feder et al. | |
| 2008/0031456 A1 | 2/2008 | Harrison et al. | |
| 2008/0298583 A1 | 12/2008 | Ahmed | |
| 2009/0198995 A1* | 8/2009 | Finlay | 713/153 |
| 2010/0115277 A1* | 5/2010 | Roscoe | 713/170 |

OTHER PUBLICATIONS

EPO, Extended European Search Report relating to application No. 10167252.5 dated May 10, 2011.
Menezes, Vanstone, Oorschot: "Handbook of Applied Cryptography", 1997, CRC Press LLC, USA, XP002634365, p. 192-195.
Lindquist, Timothy E.; Diarra, Mohamed; and Millard, Bruce R., A Java Cryptography Service Provider Implementing One-Time Pad, IEEE Proceedings of the 37th Hawaii International Conference on System Sciences, Arizona State University East, 2004.
Jenkin, Michael and Dymond, Patrick; Secure Communication Between Lightweight Computing Devices Over the Internet, IEEE Proceedings of the 35th Hawaii International Conference on System Sciences, York University, North York, Ontario, Canada.
Croft, N.J. And Olivier, M.S., Using an Approximated One-Time Pad to Secure Short Messaging Service (SMS), Information and Computer Security Architectures (ICSA) Research Group, Department of Computer Science, University of Pretoria, South Africa.
RSA Laboratories, Wireless Access-Control Research Project (WARP), http://www.rsa.com/rsalabs/node.asp?id=3598, Nov. 17, 2009.
Office Action; Canadian Patent Application No. 2,743,703; Aug. 27, 2013.
Babin, Giles; Canadian Intellectual Property Office, Requisition by the Examiner in Accordance with Subsection 30(2) of the Patent Rules, CA Application No. 2,743,703, May 15, 2014.

* cited by examiner

*Primary Examiner* — Farid Homayounmehr
*Assistant Examiner* — Suman Debnath
(74) *Attorney, Agent, or Firm* — Ridout & Maybee LLP (57) ABSTRACT

A master key may be used by each participant in a secure communication. Indeed, each participant may select and encryption key from a distinct end of the master key. To eliminate a necessity for the end points in the secure communication to maintain a master key corresponding to every possible correspondent, the participants may communicate through an encryption server.

20 Claims, 9 Drawing Sheets

TWO INDICES MOVING IN OPPOSITE DIRECTIONS FOR CRYPTOGRAPHIC BIDIRECTIONAL COMMUNICATIONS USING A SHARED MASTER KEY

FIELD

The present application relates generally to cryptographic bidirectional communication systems and, more specifically, to use of two indices moving in opposite directions in such communication systems.

BACKGROUND

In cryptography, encryption is the process of transforming information using an algorithm to make the information unreadable to anyone except those possessing special knowledge, usually referred to as a key. The result of the process is encrypted information.

One applicable encryption method is called one-time pad cryptography. In an implementation of one-time pad cryptography, the one-time pad comprises a random binary bit sequence (e.g., 10101110110). Encryption of any binary data involves using the logical "XOR" operation between the binary data and the one-time pad, thereby leading to encrypted data. At the receiver, the logical XOR operation may be used between the encrypted data and the one-time pad, thereby yielding the original binary data. Notably, one-time pad cryptography is not limited to the use of the XOR operation. Indeed, a variety of operations may be used instead of the XOR operation.

BRIEF DESCRIPTION OF THE DRAWINGS

Reference will now be made to the drawings, which show by way of example, embodiments of the present disclosure, and in which.

The encryption server approach allows a scalable extension to multiple devices by breaking down the bidirectional communication between any two devices into a sequence of two communications between the first device and the server and then from the server to the second device and vice versa.

DETAILED DESCRIPTION OF THE EMBODIMENTS

Each participant in a secure communication may select encryption keys from a shared master key. In embodiments, each of the two participant may each have a local copy of the shared master key. One participant begins encryption key selection from one end of the shared master key and the other participant begins encryption key selection from the opposite end of the shared master key. Each participant maintains an index to an element of the shared master key to avoid duplicate use of elements of the shared master key.

The shared master key may be a one-time pad. In which case, each participant may select and encryption key from a distinct end of the one-time pad. To eliminate a necessity for the end points in the secure communication to maintain a one-time pad corresponding to every possible correspondent, the participants may communicate through an encryption server.

According to an aspect of the present disclosure, there is provided a method for facilitating secure communication between a first device and a second device sharing a master key. The method comprises obtaining a first index, forming an encrypted first message by encrypting a first message from the first device to the second device using a first message key, wherein the first message key comprises a sequence of bits of a first key length selected from the master key starting at the first index, transmitting the encrypted first message to the second device along with the first index and obtaining an updated first index, wherein the updated first index is a sum of the first index and the first key length. In other aspects of the present application, a first device is provided for carrying out this method and a computer readable storage medium is provided for adapting a processor to carry out this method.

According to another aspect of the present disclosure, there is provided a method for facilitating secure communication between a first device and a second device sharing a master key. The method comprises obtaining a second index, decrypting an encrypted second message, transmitted from the second device to the first device, using a second message key comprising a sequence of bits of a second key length selected from the master key stopping at a second index and obtaining an updated second index, wherein the updated second index is a difference of the second index and the second key length. In other aspects of the present application, a first device is provided for carrying out this method and a computer readable storage medium is provided for adapting a processor to carry out this method.

Other aspects and features of the present disclosure will become apparent to those of ordinary skill in the art upon review of the following description of specific embodiments of the disclosure in conjunction with the accompanying figures.

Figure 1:
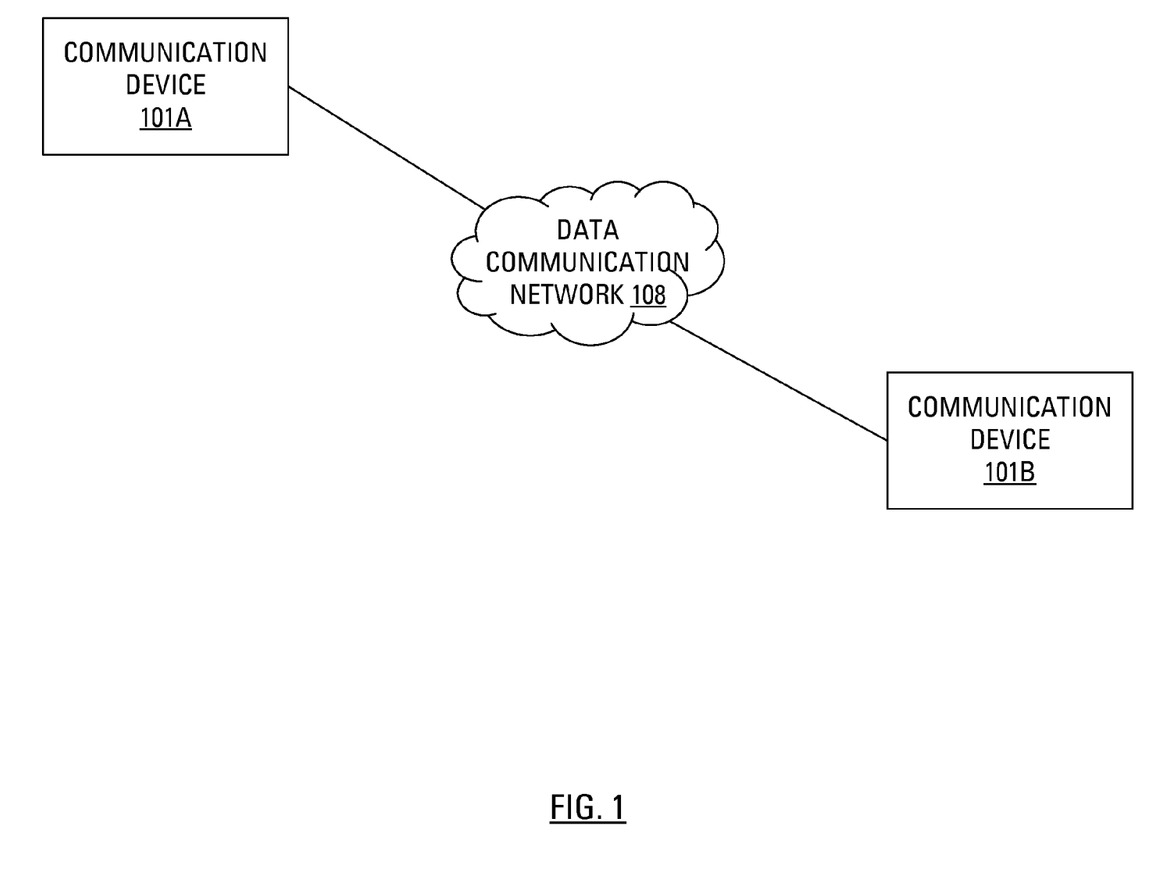
FIG. 1 illustrates bidirectional communication system between two entities.

FIG. 1 illustrates bidirectional communication system 100 that includes a first communication device 101A operable to communicate, in a bidirectional manner via a data communication network 108, with a second communication device 101B.

Figure 2:
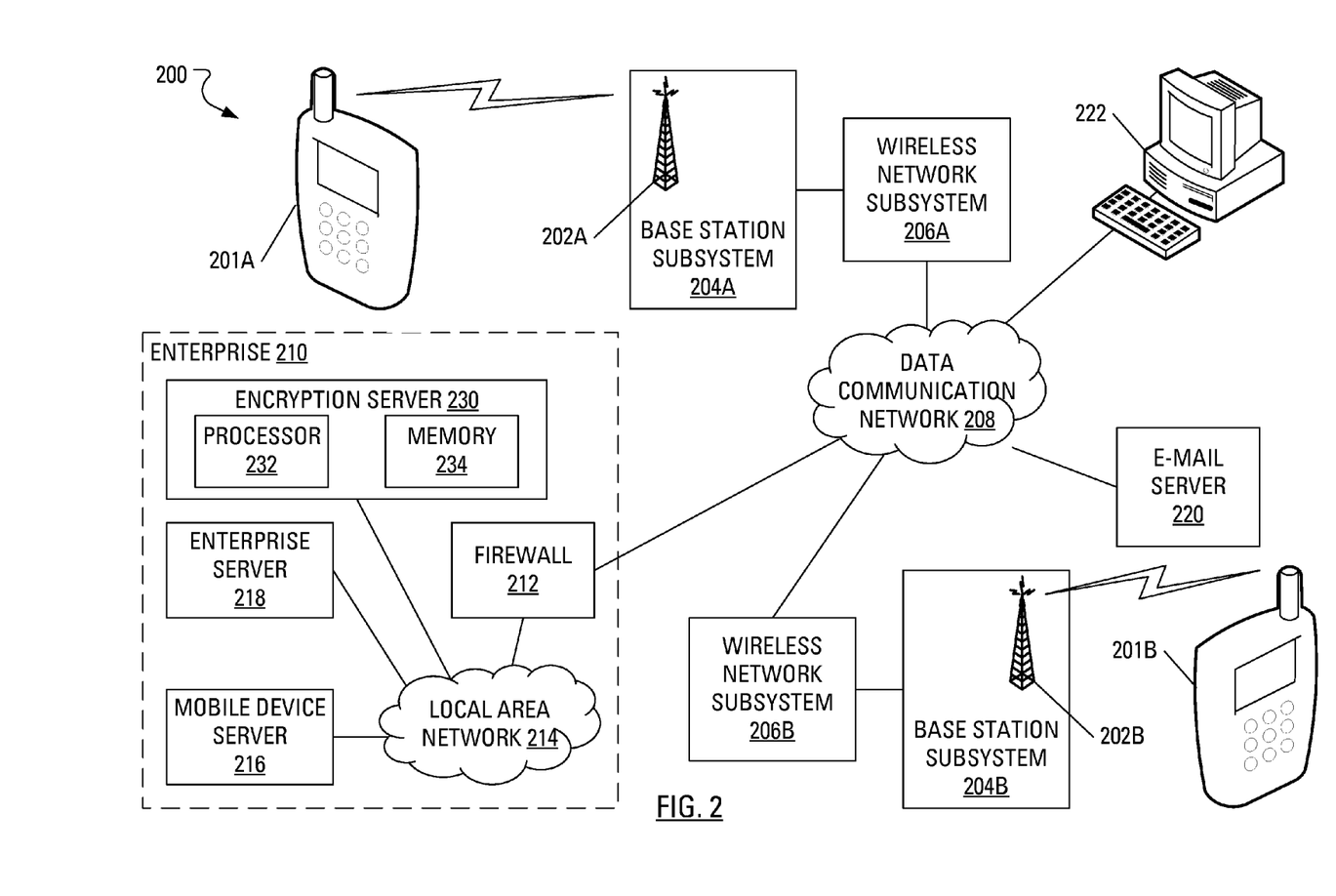
FIG. 2 illustrates elements of an exemplary network environment for electronic messaging, the elements including a first communication device, a second communication device and an enterprise, which enterprise includes an encryption server.

FIG. 2 illustrates elements of an exemplary network environment 200 for electronic messaging. The elements of the exemplary network environment 200 include multiple wireless carrier networks and a data communication network 208, which may be considered to represent at least one wide area network, such as the present day Internet and successors, as well as, potentially, multiple local area networks. A first base station antenna 202A, with which a first wireless communication device 201A may communicate wirelessly, is provided as part of a first base station subsystem 204A.

The first base station subsystem 204A connects to a first wireless network subsystem 206A. In an exemplary Global System for Mobile communications (GSM) implementation, the first wireless network subsystem 206A includes, among other components, a Mobile Services Switching Center, a Home Location Register, a Visitor Location Register, a relay and a Short Messaging Service Center (SMSC). As illustrated in FIG. 2, the first wireless network subsystem 206A is connected to the data communication network 208.

Also connected to the data communication network 208 is a second wireless network subsystem 206B. Similar to the first wireless network subsystem 206A, the second wireless network subsystem 206B may include a Mobile Services Switching Center, a Home Location Register, a Visitor Location Register, a relay and an SMSC. The second wireless network subsystem 206B connects to a second base station subsystem 204B with a second base station antenna 202B. The second base station antenna 202B may allow the second base station subsystem 204B to communicate wirelessly with a second communication device 201B.

The first communication device 201A may be associated with an enterprise 210 connected to the data communication network 208. The enterprise 210 may, for instance, include a firewall or proxy server 212 connecting to the data communication network 208 and to a local area network (LAN) 214. The LAN 214 may allow communication between a device server 216, an enterprise server 218, an encryption server 230 and between the servers 216, 218, 230 and other network entities (not shown) through the data communication network 208. The encryption server 230 includes components such as a processor 232 and a memory 234.

Also connected to the data communication network 208 may be an e-mail server 220 and a desktop computer 222, which may be associated with a user having an account on the e-mail server 220.

Figure 3:
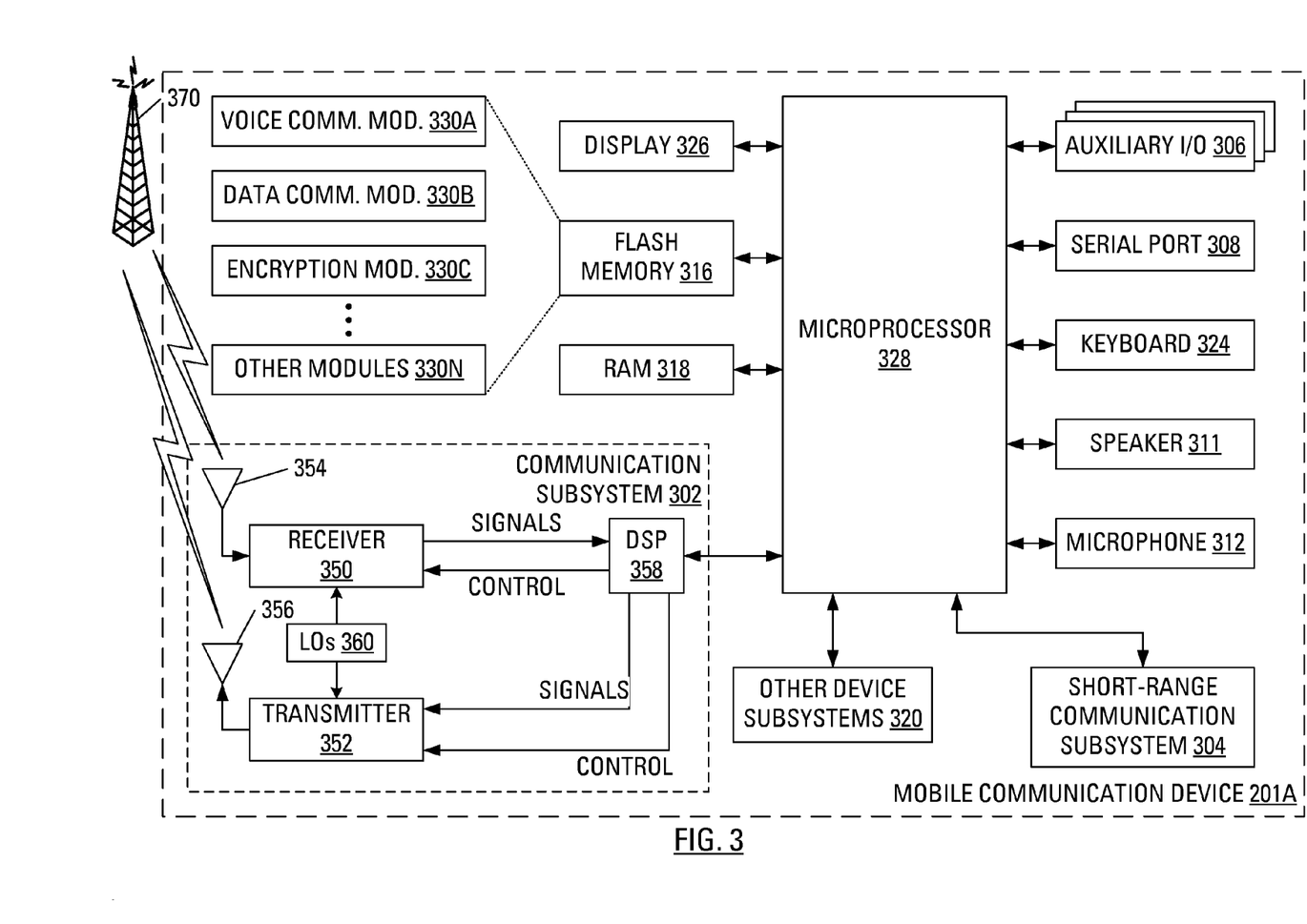
FIG. 3 illustrates the first communication device of the environment of FIG. 2.

FIG. 3 illustrates the first communication device 201A. The first communication device 201A includes a housing, an input device (e.g., a keyboard 324 having a plurality of keys) and an output device (e.g., a display 326), which may be a full graphic, or full color, Liquid Crystal Display (LCD). In some embodiments, the display 326 may comprise a touchscreen display. In such embodiments, the keyboard 324 may comprise a virtual keyboard. Other types of output devices may alternatively be utilized. A processing device (a microprocessor 328) is shown schematically in FIG. 3 as coupled between the keyboard 324 and the display 326. The microprocessor 328 controls the operation of the display 326, as well as the overall operation of the first communication device 201A, in part, responsive to actuation of the keys on the keyboard 324 by a user.

The housing may be elongated vertically, or may take on other sizes and shapes (including clamshell housing structures). Where the keyboard 324 includes keys that are associated with at least one alphabetic character and at least one numeric character, the keyboard 324 may include a mode selection key, or other hardware or software, for switching between alphabetic entry and numeric entry.

In addition to the microprocessor 328, other parts of the first communication device 201A are shown schematically in FIG. 3. These may include a communications subsystem 302, a short-range communications subsystem 304, the keyboard 324 and the display 326. The first communication device 201A may further include other input/output devices, such as a set of auxiliary I/O devices 306, a serial port 308, a speaker 310 and a microphone 312. The first communication device 201A may further include memory devices including a flash memory 316 and a Random Access Memory (RAM) 318 and a removable memory subsystem 320. The first communication device 201A may comprise a two-way radio frequency (RF) communication device having voice and data communication capabilities. In addition, the first communication device 201A may have the capability to communicate with other computer systems via the Internet.

Operating system software executed by the microprocessor 328 may be stored in a computer readable medium, such as the flash memory 316, but may be stored in other types of memory devices, such as a read only memory (ROM) or similar storage element. In addition, system software, specific device applications, or parts thereof, may be temporarily loaded into a volatile store, such as the RAM 318. Communication signals received by the device may also be stored to the RAM 318.

The microprocessor 328, in addition to its operating system functions, enables execution of software applications on the first communication device 201A. A predetermined set of software applications that control basic device operations, such as a voice communications module 330A and a data communications module 330B, may be installed on the first communication device 201A (for example, during manufacture). An encryption/decryption module 330C may also be installed on the first communication device 201A (for example, during manufacture), to implement aspects of the present disclosure. As well, additional software modules, illustrated as another software module 330N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network represented by the first base station antenna 202A. The data items managed by the PIM application may be seamlessly integrated, synchronized and updated via the wireless carrier network 202A with the device user's corresponding data items stored or associated with a host computer system.

Communication functions, including data and voice communications, are performed through the communication subsystem 302 and, possibly, through the short-range communications subsystem 304. The communication subsystem 302 includes a receiver 350, a transmitter 352 and one or more antennas, illustrated as a receive antenna 354 and a transmit antenna 356. In addition, the communication subsystem 302 also includes a processing module, such as a digital signal processor (DSP) 358, and local oscillators (LOs) 360. The specific design and implementation of the communication subsystem 302 is dependent upon the communication network in which the first communication device 201A is intended to operate. For example, the communication subsystem 302 of the first communication device 201A may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the first communication device 201A.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the first communication device 201A may send and receive communication signals over the wireless carrier network 202A. Signals received from the wireless carrier network 202A by the receive antenna 354 are routed to the receiver 350, which provides for signal amplification, frequency down conversion, filtering, channel selection, etc., and may also provide analog to digital conversion. Analog-to-digital conversion of the received signal allows the DSP 358 to perform more complex communication functions, such as demodulation and decoding. In a similar manner, signals to be transmitted to the wireless carrier network 202A are processed (e.g., modulated and encoded) by the DSP 358 and are then provided to the transmitter 352 for digital to analog conversion, frequency up conversion, filtering, amplification and transmission to the wireless carrier network 202A (or networks) via the transmit antenna 356.

In addition to processing communication signals, the DSP 358 provides for control of the receiver 350 and the transmitter 352. For example, gains applied to communication signals in the receiver 350 and the transmitter 352 may be adaptively controlled through automatic gain control algorithms implemented in the DSP 358.

In a data communication mode, a received signal, such as a text message or web page download, is processed by the communication subsystem 302 and is input to the microprocessor 328. The received signal is then further processed by the microprocessor 328 for output to the display 326, or alternatively to some auxiliary I/O devices 306. A device user may also compose data items, such as e-mail messages, using the keyboard 324 and/or some other auxiliary I/O device 306, such as a touchpad, a rocker switch, a thumb-wheel, a trackball, a touchscreen, or some other type of input device. The composed data items may then be transmitted over the wireless carrier network 202A via the communication subsystem 302.

In a voice communication mode, overall operation of the device is substantially similar to the data communication mode, except that received signals are output to a speaker 310, and signals for transmission are generated by a microphone 312. Alternative voice or audio I/O subsystems, such as a voice message recording subsystem, may also be implemented on the first communication device 201A. In addition, the display 326 may also be utilized in voice communication mode, for example, to display the identity of a calling party, the duration of a voice call, or other voice call related information.

The short-range communications subsystem 304 enables communication between the first communication device 201A and other proximate systems or devices, which need not necessarily be similar devices. For example, the short-range communications subsystem may include an infrared device and associated circuits and components, or a Bluetooth™ communication module to provide for communication with similarly-enabled systems and devices.

In operation, a user of the first communication device 201A may compose an e-mail message for sending to a user of the desktop computer 222 (or the second communication device 201B). As part of the e-mail message composition process, the user may select to have an encryption method applied to the message before the message is transmitted.

The first communication device 201A may be configured to use master key cryptography as the encryption method. The perceived security of master key cryptography is related to four factors: the degree of randomness present in the master key; the size of the master key being at least the same size as the data to be encrypted; the security of the means of providing the master key to the parties that will use the master key; and whether the master key, or portion thereof, has been used more than once.

Alternatively, the first communication device 201A may be configured to use an other encryption method. Rather than adapting the size of the encryption key to the size of the message, each encryption key may have a fixed size, say, 512 bits.

In overview, according to aspects of the present disclosure, devices involved in a bidirectional communication each select encryption keys from a shared master key. One device begins encryption key selection from one end of the shared master key and the other device begins encryption key selection from the opposite end of the shared master key. Each device maintains an index to an element of the shared master key to avoid duplicate use of elements of the shared master key. In use, the two indices move in opposite directions.

In an embodiment, when configuring the first communication device 101A of FIG. 1, the first communication device 101A is provided with a master key. When the encryption module of the first communication device 101A receives (step 402, FIG. 4) a message that is to be sent to the second communication device 101B, the first communication device 101A obtains an index to a bit in the master key. The first communication device 101A selects (step 404), from the master key, a sequence of bits of a key length, thereby forming a message key. The sequence of bits is selected starting at the bit indicated by the index. The first communication device 101A forms (step 406) an encrypted message by encrypting the message using the message key and transmits (step 408) the encrypted message to the second communication device 101B along with the index. The first communication device 101A also obtains (step 410) an updated index from the sum of the index and the key length.

Upon receipt (step 602, FIG. 6) of the encrypted message along with the index, the second communication device 101B may be configured to obtain (step 604) the message key using the index in conjunction with a locally stored version of the master key associated with the first communication device 101A. The second communication device 101B may then form (step 606) a decrypted message by decrypting the encrypted message using the message key.

In an embodiment, when configuring the first communication device 201A of FIG. 2, the first communication device 201A is provided with a master key. The encryption server 230 is also provided with a copy of the master key, which may be stored in the memory 234. When the first communication device 201A is to encrypt some data, the first communication device 201A selects an encryption key from the master key. The encryption server 230 may be configured to select a decryption key from the master key, wherein the decryption key is identical to the encryption key selected by the first communication device 201A from a copy of the same master key. The encryption server 230 thus stores a plurality of master keys, one for each communication device that it securely communicates with (whether receiving messages from or sending messages to).

Figure 4:
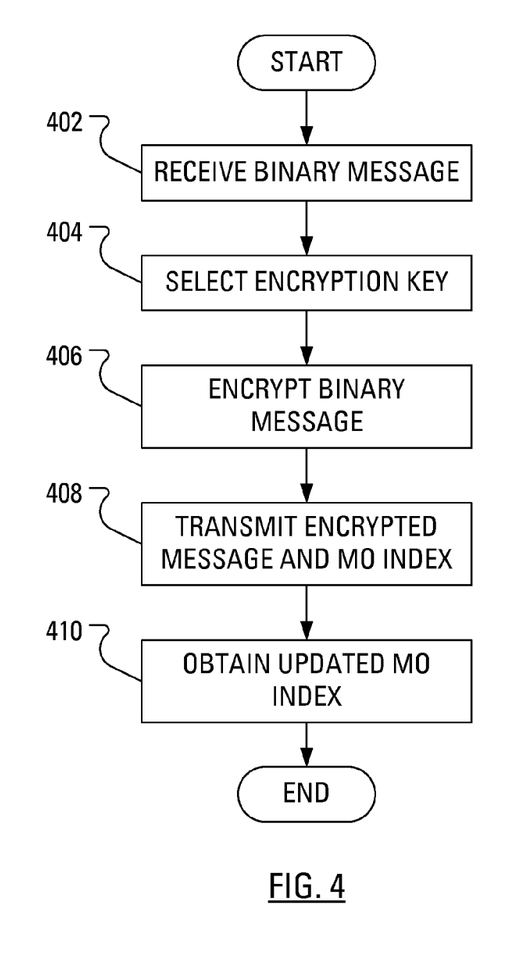
FIG. 4 illustrates example steps in a message encryption and transmission method at the first communication device of FIG. 3, according to an embodiment.

FIG. 4 illustrates example steps in a message encryption and transmission method at the first communication device 201A. Initially, the microprocessor 328 (executing the encryption module 330C) receives (step 402) the binary message. The microprocessor 328 then selects (step 404) an encryption key from the master key. In particular, the encryption key is selected as starting from a previously recorded location in the master key. The location in the master key is represented by a mobile originating (MO) index.

Figure 5:
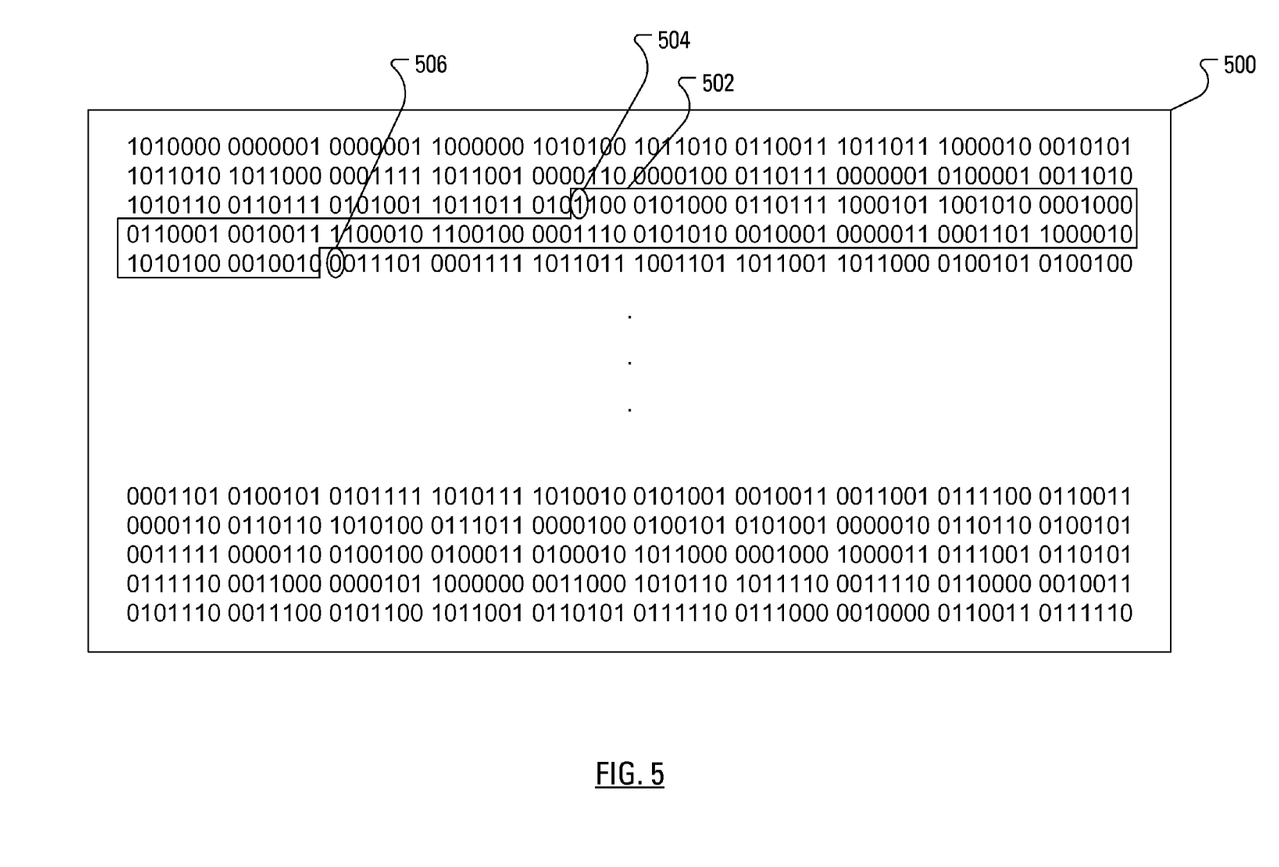
FIG. 5 illustrates an example master key, for use by the first communication device of FIG. 3.

An example master key 500, for use by the microprocessor 328 of the first communication device 201A, is illustrated in FIG. 5.

To provide the master key 500 on the first communication device 201A can be provided on fixed memory (e.g., a ROM chip) or a removable memory, e.g., a Secure Digital (SD) card. The first communication device 201A may receive an SD card into the removable memory subsystem 320 through which the microprocessor 328 may access the master key 500 stored on the SD card (not shown). The master key 500 may be selected to be as large as the expected total encrypted data load during the service life of the first communication device 201A. For example, if the service life is five years, an 8 GB master key would allow an average of about 4 MB of data to be encrypted/decrypted per day.

A selected encryption key is indicated, in FIG. 5, by reference numeral 502. The encryption key 502 begins at a previously recorded location 504, indicated by MO index. It is expected that the MO index has been previously recorded so that the microprocessor 328 can begin the encryption key 502 at the previously recorded location 504. Selection of random bits for the encryption key 502 proceeds from the previously recorded location 504 from left to right within the master key 500. Selection of random bits for the encryption key 502 continues until the encryption key has at least as many bits as the data that is to be encrypted. In embodiments, upon completion of the selection of random bits for the encryption key 502, an index (the MO index) to a next unselected bit 506 is recorded for later use as the first bit in the next encryption key to be selected for the next message. In embodiments, some bits of the shared master key may not be used between selections of successive encryption keys.

The microprocessor 328 employs the selected encryption key 502 to encrypt (step 406) the binary message. Once the message has been encrypted, the microprocessor 328 transmits (step 408), to the enterprise 210, the encrypted message and the MO index. More particularly, the microprocessor 328 transmits (step 408) the encrypted message and the MO index to the encryption server 230. It should be clear to a person of ordinary skill in the art that, along with the encrypted message, the microprocessor 328 transmits a clear text header to provide information such as an indication that the message is encrypted as well as the MO index. The destination of the message, which may be the second communication device 201B, may either be included in the encrypted message or in the clear text header.

A worker skilled in the art will recognize that, in embodiments (e.g., for one-time pad cryptography based on XOR schemes), encryption and decryption may be done in a streaming fashion (for example, one bit at a time). So it is not necessary that the entire encryption (or decryption) key be determined prior to starting the encryption (or decryption). For a general encryption algorithm, this may not be the case. The MO and MT indices may be updated continuously during encryption and decryption in these embodiments.

Figure 6:
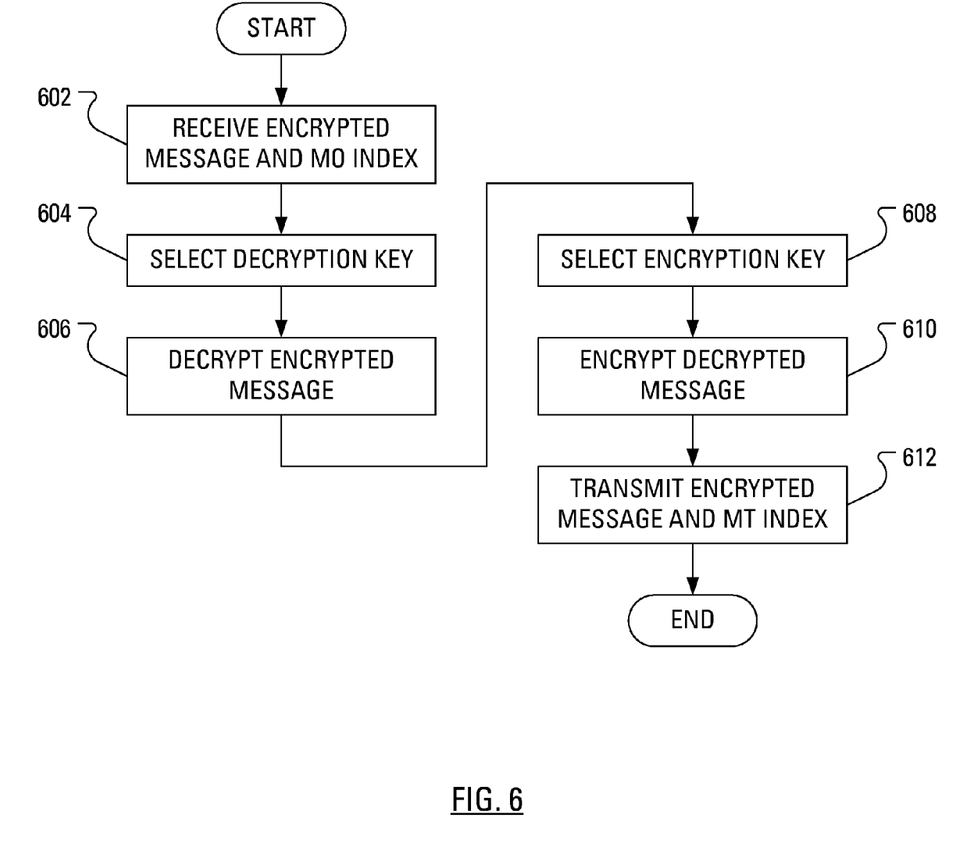
FIG. 6 illustrates example steps in a message encryption/decryption and reception/transmission method at the encryption server of FIG. 2, according to an embodiment.

FIG. 6 illustrates example steps in a message encryption/decryption and reception/transmission method at the encryption server 230. Instructions for use by the processor 232 in carrying out steps in the method of FIG. 6 may be stored in the memory 234.

Initially, the processor 232 receives (step 602) the encrypted message and the MO index. Recognizing that the message is encrypted, the processor 232 selects a decryption key. Selecting the decryption key involves initially selecting the appropriate master key 500. As will be appreciated, while the first communication device 201A only has a single master key 500, the encryption server 230 maintains, in the server memory 234, a different master key for every communication device with which secure communication is to occur. In another embodiment, the different master keys in the server memory 234 could be contiguous portions of the same much larger master key.

The copies of the master key 500 at the encryption server 230 and on the first communication device 201A are given the same unique identifier, so that the copies of the master key 500 can be linked. One proposed unique identifier is an e-mail address of the user associated with the first communication device 201A. Another proposed unique identifier is a unique identification number associated with the first communication device 201A. In either case, the clear text header associated with the encrypted message transmitted, by the first communication device 201A, to the encryption server 230 should provide enough information for the encryption server 230 to properly select the appropriate master key 500.

Upon selecting the appropriate master key 500, the processor 232 of the encryption server 230 uses the MO index to begin to select the decryption key. The decryption key should be identical to the encryption key and will be as the processor 232 begins selecting the decryption key at the location 504 pointed to by the received MO index. The clear text header of the encrypted message may also include an indication of the length of the encryption key, so that the processor 232 may complete the selection of the decryption key at the appropriate bit. In embodiments, the processor 232 may alternatively simply derive the length of the decryption key from the length of the received encrypted message.

The processor 232 may use the decryption key to decrypt (step 606) the received encrypted message.

Upon obtaining a decrypted message, the processor 232 proceeds to select (step 608) an encryption key to use to re-encrypt the message. Selecting the encryption key involves initially selecting an appropriate master key. The processor 232 may use information in the received decrypted message to determine a destination for the message and may then select an appropriate master key based on the destination.

Figure 7:
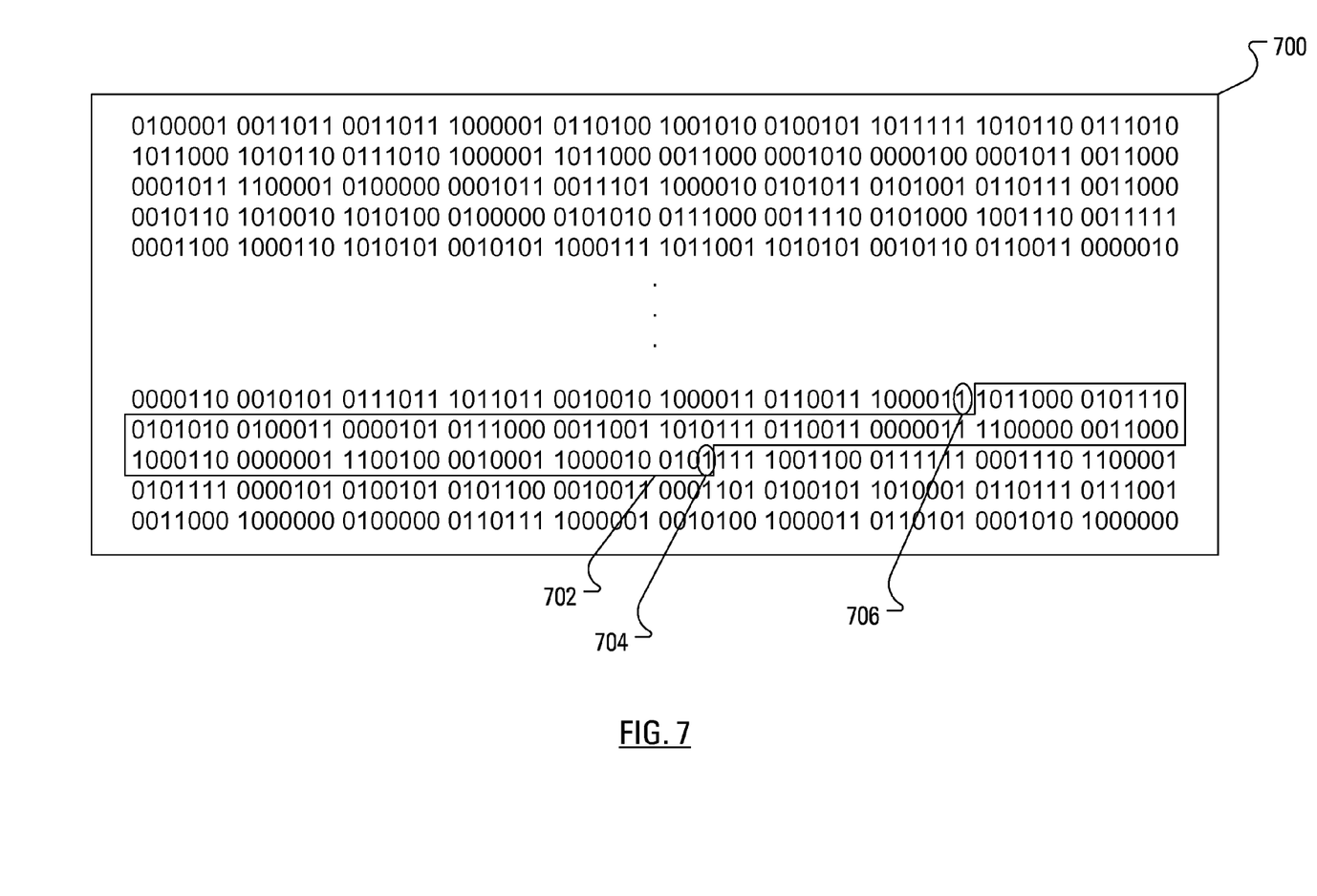
FIG. 7 illustrates an example master key, for use by the encryption server of FIG. 2 when transmitting to the second communication device of FIG. 2.

FIG. 7 illustrates an example master key 700 for use by the processor 232 of the encryption server 230 when communicating securely with the second communication device 201B. A selected encryption key is indicated by reference numeral 702. The encryption key 702 begins at a previously recorded location, indicated by reference numeral 704. It is expected that a mobile terminating (MT) index has been previously recorded so that the processor 232 can begin the encryption key 702 at the previously recorded location 704. Selection of random bits for the encryption key 702 proceeds from the previously recorded location 704 from right to left within the master key 700. Selection of random bits for the encryption key 702 continues until the encryption key has at least as many bits as the data that is to be encrypted. Upon completion of the selection of random bits for the encryption key 702, an index (the MT index) to a next unselected bit 706 is recorded for later use as the first bit in the next encryption key to be selected.

The processor 232 employs the selected encryption key 702 to encrypt (step 610) the binary message. Once the message has been encrypted, the processor 232 transmits (step 612), to the second communication device 201B, the encrypted message and the MT index to the previously recorded location 704.

The encryption server 230 manages the MT index and ensures that the MT index is an ever-decreasing number that decreases by at least the size of each message encrypted, so that no portion of the master key 700 is used more than once.

While selection of random bits for the encryption key 502 has been described above as proceeding from left to right from the MO index and selection of random bits for the encryption key 702 has been described above as proceeding from right to left from the MT index, a reverse of this is also contemplated. That is, selection of random bits for the encryption key 502 may proceed from right to left from the MO index and selection of random bits for the encryption key 702 may proceed from left to right from the MT index. In the reverse case, the encryption server 230 manages the MT index and ensures that the MT index is an ever-increasing number.

Since all messages go through the encryption server 230, an indication of the destination can be encrypted separate from the body of the message. To keep the encryption server 230 blind to message content, the server first determines the destination (and thus identify the associated master key associated with the recipient) and second to decrypt the message (after the message has been encrypted by the recipient's pad).

Figure 8:
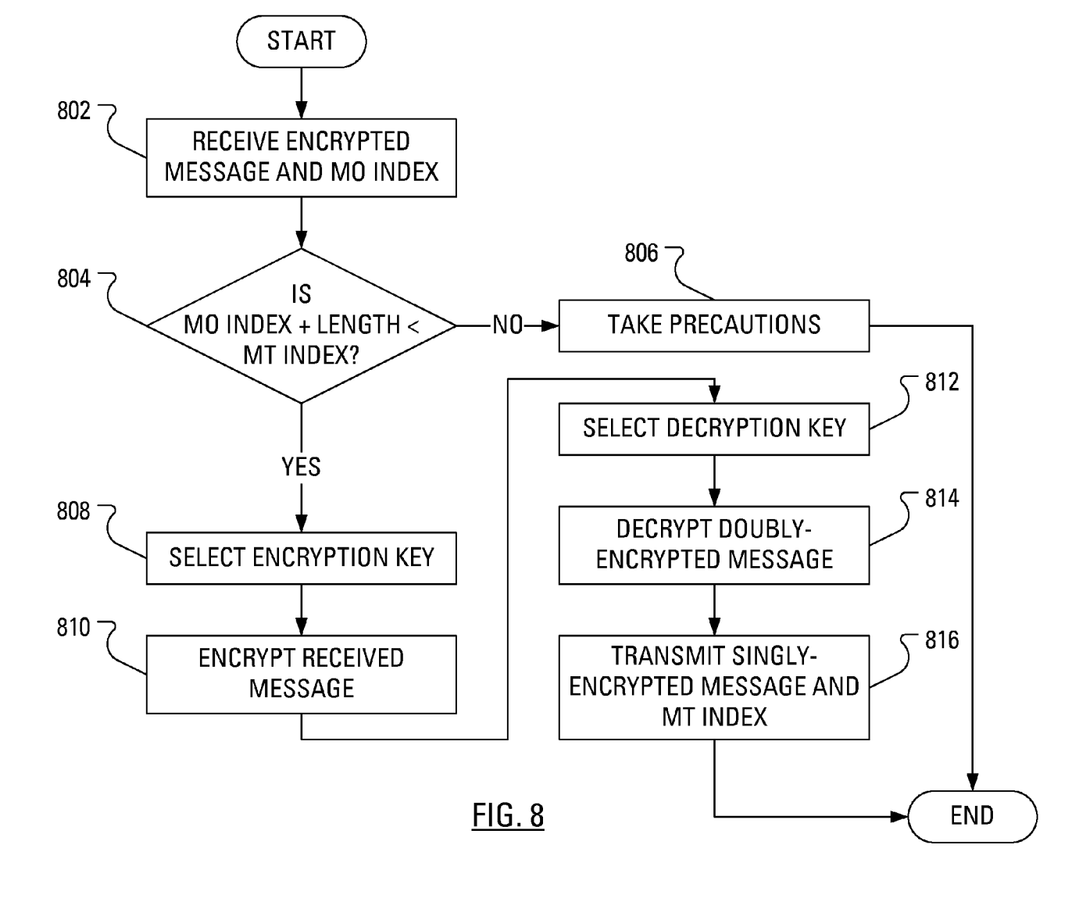
FIG. 8 illustrates example steps in a further message encryption/decryption and reception/transmission method at the encryption server of FIG. 2, according to an embodiment.

An alternative embodiment to the method of FIG. 6 is illustrated in FIG. 8. In the method of the alternative embodiment, the encryption server 230 receives (step 802) the encrypted message and the MO index. In embodiments, upon receipt of the message, the processor 232 forms a sum of the value of the received MO index and the key length associated with the received encrypted message and then determines (step 804) whether the sum is greater than the value of the MT index associated with the relevant master key. In the event that the sum is greater than the value of the MT index, then it may be considered that the first communication device 201A has reused a portion of the master key 500 (or stopped encrypting mid-message) when encrypting the encrypted message. In another embodiment, the summation above may include a value representative of a predetermined number of precautionary padding bits.

Notably, encryption may be performed using one or more operations distinct from the XOR operation and, accordingly, there will not always be a direct correlation between the length of the encryption key and the length of the message. Thus, in the general case, the sum that is formed and compared to the MT index is a sum of the value of the received MO index and the length of the encryption key.

Responsive to determining (step 804) that the sum is greater than the value of the MT index associated with the relevant master key, the processor 232 may be arranged to take precautions (step 806). Such precautions may include but are not limited to: halting all encrypted messages to that user associated with the relevant master key; warning the user that the master key is used up and further encrypted communications may be vulnerable; or returning encrypted messages/errors to sender rather than forwarding messages to a user who has no viable master key remaining.

In one embodiment, the encryption server 230 stores the last known MO index value for each communication device and periodically checks a MO index value against the respective MT index for each communication device. Likewise, the first communication device 201A can store the last known MT index value received from the encryption server 230 and take similar precautions.

In embodiments, Responsive to determining (step 804) that the sum is less than the MT index associated with the relevant master key, the processor 232 selects (step 808) an encryption key to use to doubly-encrypt the message. Selecting the encryption key involves initially selecting the master key 700 associated with the destination of the message. As discussed, the processor 232 uses previously stored MT index to determine a starting bit 704 for the encryption key 702. The processor 232 then employs the selected encryption key 702 to encrypt (step 810) the received encrypted message.

Once the message has been doubly-encrypted, the encryption server 230 selects a decryption key. Selecting the decryption key involves initially selecting the appropriate master key 500 associated with the source of the message. Upon selecting the appropriate master key 500, the processor 232 of the encryption server 230 uses the MO index to begin to select (step 812) the decryption key 502. Once the decryption key has been selected, the processor 232 may use the decryption key to decrypt (step 814) the doubly-encrypted message and generate a singly-encrypted message. The processor 232 then transmits (step 816), to the second communication device 201B, the singly-encrypted message and the MT index.

Notably, the method of FIG. 8 is possible due to special properties of the XOR operation. Other encryption algorithms may not have these special properties.

Figure 9:
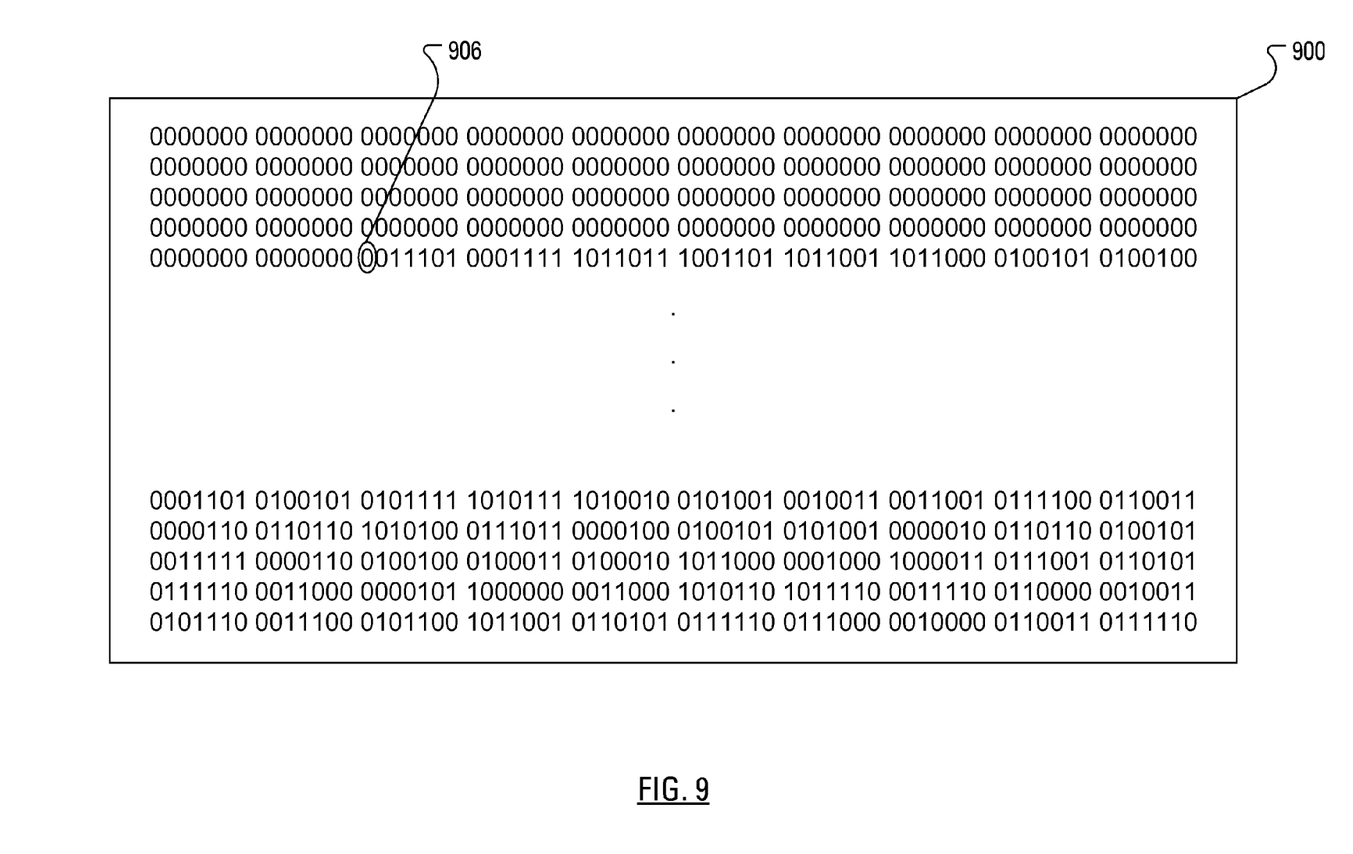
FIG. 9 illustrates the example master key of FIG. 5, after use by the first communication device of FIG. 3, according to an embodiment.

Master keys stored on over-writable memory (SD cards, hard disks) can have their bits erased (e.g., all set to 0) as they are used, as an additional precaution. FIG. 9 illustrates an example master key 900 as a version of the example master key 500 of FIG. 5, wherein the microprocessor 328 has set to zero the bits that have been used for encryption keys. Notably, the MO index associated with the example master key 900 of FIG. 9 refers to the bit identified by the reference numeral 906.

Peer-to-peer (i.e., direct communication device to communication device) and inter-server communications follow the principles outlined above, with each element of a communicating pair having a copy of the master key associated with the other element and associated MO index and MT index. For peer-to-peer master key communication, maintaining a master key may become less desirable as the number of peers in a group increases. However, the concept may be considered more practical for a plurality of servers, each server having its own master key and a copy of a master key associated each other server, so that messages may be relayed between servers serving different groups of communication devices, thereby alleviating the need for each server to have a copy of a master key for every communication device.

Using a group of servers as described above reduces the chances of compromise by attack on one server, as the attacker would have to know which server stores the master key of the user of interest.

Unique master keys may be generated at a secure location and copied to server storage and to the memory of only one communication device, to ensure that only two copies of a given master key exist.

Master keys intended for use on communication devices can be sold at retail on SD cards, Read-Only Memory (ROM) cards, or in the communication devices themselves, along with a unique identifier for the master key. Copying a master key can be prevented by package design or other physical technique.

Conveniently, the use of an encryption key from a master key occurs without awareness of an end user, who may simply request that a message be encrypted. Furthermore, in some embodiments, the encryption server 230 remains blind to message content; decrypted messages only exist on devices. Additionally, XOR-based binary master key encryption is data independent. Any kind of payload can be encrypted with a master key, including: e-mail messages; attachments to e-mail messages; instant messages; images; audio streams; and video streams.

It has been noted, in general, that master key encryption algorithms are very fast, consisting of little more than a XOR operation. This speed of encryption may be seen to compare favorably to known methods, such as the RSA encryption algorithm.

The MO index and/or the MT index and/or the unique identifiers that are associated with specific master keys can be known by anyone without compromising security. However, the security of the master key communication systems described herein is directly related to the secrecy maintained for the master keys employed.

Aspects of the present disclosure may be considered to be beneficially tolerant to loss of one or more messages, which can occur in unreliable communications systems. This is because the decrypting device, which may be, for two examples, the encryption server 230 or the first communication device 201A, uses the index provided with the message. A lost message may simply mean that the decrypting device skips over a portion of the master key that was used to encrypt the lost message. Message receipt acknowledgement is not required to align the indices stored on the encrypting and decrypting devices, since the index accompanying any given message governs that message's decryption. In embodiments, the index need not be provided with the message but the server may just keep track of the changes in the indices.

By arranging that the MO index and the MT index to start at opposite ends of the master key, a simple comparison of the indices can be employed to avoid reuse of any portion of the master key. Additionally, such a scheme of index starting points equally accommodates communication devices that mainly transmit messages, communication devices that mainly receive messages and communication devices with a balanced load of transmitted and received messages. That is, the location in the master key of the crossover of the MO and MT indices will reflect the use history of the device. Further, this may reduce memory required to store the master key because, regardless of the usage pattern of the device, the master key can be fully consumed (or nearly fully consumed, depending on any precautionary padding bits added when detecting an index crossover).

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method for facilitating secure communication between a first device and a second device, the method comprising, at a third device:
   receiving, from the first device, an encrypted first message and a first index, said encrypted first message specifying the second device as a destination;
   selecting a master key;
   forming a decrypted first message by using a first message key to decrypt the encrypted first message, wherein the first message key comprises a sequence of bits of a key length selected from the master key starting at a first location in the master key referenced by the first index and moving in a first direction;
   determining a previously recorded second index to a second location in the master key;
   forming a re-encrypted first message by using a second message key to encrypt the decrypted first message, the second message key comprising a sequence of bits of the key length selected from the master key moving in a direction opposite to the first direction and stopping at the second location in the master key referenced by the second index; and
   transmitting, to the second device, the re-encrypted first message and the second index;
   wherein no portion of the master key is used more than once.

2. The method of claim 1 further comprising obtaining an updated first index, wherein the updated first index is a sum of the first index and the key length.

3. The method of claim 2 further comprising recording the updated first index.

4. The method of claim 1 further comprising obtaining an updated second index, wherein the updated second index is a difference of the second index and the key length.

5. The method of claim 4 further comprising recording the updated second index.

6. The method of claim 1 wherein the key length is equivalent to a length of the first message.

7. The method of claim 1 wherein the master key comprises a one-time pad of random bits.

8. The method of claim 1 wherein the key length is one bit and the first message has a length of one bit.

9. The method of claim 1 further comprising recording the updated first index.

10. A first device comprising:
    a memory storing a master key;
    a processor adapted to:
       receive, from a second device, an encrypted first message and a first index, said encrypted first message specifying a third device as a destination;
       select the master key;
       form a decrypted first message by using a first message key to decrypt the encrypted first message, wherein the first message key comprises a sequence of bits of a key length selected from the master key starting at a first location in the master key referenced by the first index and moving in a first direction;
       determine a previously recorded second index to a second location in the master key;
       form a re-encrypted first message by using a second message key to encrypt the decrypted first message, the second message key comprising a sequence of bits of the key length selected from the master key moving in a direction opposite to the first direction and stopping at the second location in the master key referenced by the second index; and transmit, to the third device, the re-encrypted first message and the second index;

wherein no portion of the master key is used more than once.

11. A non-transitory computer readable storage medium containing computer-executable instructions that, responsive to being performed by a processor at a third device, cause the processor to:

receive, from a first device, an encrypted first message and a first index, said encrypted first message specifying a second device as a destination;

select a master key;

form a decrypted first message by using a first message key to decrypt the encrypted first message, wherein the first message key comprises a sequence of bits of a key length selected from the master key starting at a first location in the master key referenced by the first index and moving in a first direction;

determine a previously recorded second index to a second location in the master key;

form a re-encrypted first message by using a second message key to encrypt the decrypted first message, the second message key comprising a sequence of bits of the key length selected from the master key moving in a direction opposite to the first direction and stopping at the second location in the master key referenced by the second index; and transmit, to the second device, the re-encrypted first message and the second index;

wherein no portion of the master key is used more than once.

12. The non-transitory computer readable storage medium of claim 11 wherein the instructions further cause the processor to obtain an updated first index, wherein the updated first index is a sum of the first index and the key length.

13. The non-transitory computer readable storage medium of claim 12 wherein the instructions further cause the processor to record the updated first index.

14. The non-transitory computer readable storage medium of claim 11 wherein the instructions further cause the processor to obtain an updated second index, wherein the updated second index is a difference of the second index and the key length.

15. The non-transitory computer readable storage medium of claim 14 wherein the instructions further cause the processor to record the updated second index.

16. The non-transitory computer readable storage medium of claim 11 wherein the key length is equivalent to a length of the first message.

17. The non-transitory computer readable storage medium of claim 11 wherein the master key comprises a one-time pad of random bits.

18. The non-transitory computer readable storage medium of claim 11 wherein the key length is one bit and the first message has a length of one bit.

19. The non-transitory computer readable storage medium of claim 11 further comprising recording the updated first index.

20. The device of claim 10 wherein the processor is further adapted to obtain an updated second index, wherein the updated second index is a difference of the second index and the key length.

* * * * *